US008938541B2

(12) United States Patent
Zhang et al.

(10) Patent No.: US 8,938,541 B2
(45) Date of Patent: Jan. 20, 2015

(54) METHOD AND SYSTEM TO ALLOCATE BANDWIDTH IN CLOUD COMPUTING NETWORKS

(71) Applicant: Ericsson AB, Stockholm (SE)

(72) Inventors: Ying Zhang, San Jose, CA (US); Dan Li, Beijing (CN); Jing Zhu, Beijing (CN)

(73) Assignee: Ericsson AB, Stockholm (SE)

( * ) Notice: Subject to any disclaimer, the term of this patent is extended or adjusted under 35 U.S.C. 154(b) by 152 days.

(21) Appl. No.: 13/663,416

(22) Filed: Oct. 29, 2012

(65) Prior Publication Data
US 2014/0122724 A1 May 1, 2014

(51) Int. Cl.
G06F 15/16 (2006.01)
G06F 9/50 (2006.01)
(52) U.S. Cl.
CPC .............. *G06F 9/5077* (2013.01); *G06F 9/505* (2013.01)
USPC .......................................... 709/226; 709/224
(58) Field of Classification Search
CPC ............................... G06F 9/5077; G06F 9/505
USPC ........................... 709/200–203, 217–227, 228
See application file for complete search history.

(56) References Cited

U.S. PATENT DOCUMENTS

| 7,886,183 B2 * | 2/2011 | Krishnan et al. ............. 714/5.11 |
| 2011/0142053 A1 | 6/2011 | Van Der Merwe et al. |
| 2013/0014101 A1 | 1/2013 | Ballani et al. |
| 2013/0031559 A1 | 1/2013 | Alicherry |
| 2013/0275974 A1 * | 10/2013 | Cao et al. ......................... 718/1 |

OTHER PUBLICATIONS

Zhang, Ying, "Network Bandwidth Allocation in Multi-Tenancy Cloud Computing Networks", corresponding to U.S. Appl. No. 13/791,316, filed Mar. 8, 2013, 27 pages.
Zhang, Ying, "A Method and System to Allocate Bandwidth for Heterogeneous Bandwidth Request in Cloud Computing Networks", corresponding to U.S. Appl. No. 13/851,694, filed Mar. 27, 2013, 27 pages.
Hitesh Ballani et al., "Towards Predictable Datacenter Networks," Aug. 15-19, 2011, 12 pages, SIGCOMM'11, Toronto, Ontario, Canada.
Jon Crowcroft et al., "Differentiated End-to-End Internet Services Using a Weighted Proportional Fair Sharing TCP," Jun. 30, 1998, 17 pages.

(Continued)

*Primary Examiner* — Moustafa M Meky
(74) *Attorney, Agent, or Firm* — Blakely Sokoloff Taylor & Zafman LLP

(57) ABSTRACT

A method implemented by a network service provider to provide a virtual network to tenants requiring bandwidth in a cloud computing environment, wherein the virtual network includes a first set of one or more virtual switches that manage a second set of one or more physical servers that host a first plurality of available virtual machines (VMs), the method comprising receiving by at least one virtual switch a bandwidth request for a second plurality of VMs, determining whether to accept the request of the second plurality of VMs by calculating an allocation range (AR) associated to the virtual switch, wherein the AR denotes at least one discontinuous VM allocation space within the virtual switch, and allocating VMs to the tenant in response to the determination of accepting the request of the second plurality of VMs.

28 Claims, 12 Drawing Sheets

(56) References Cited

OTHER PUBLICATIONS

Chuanxiong Guo et al., "SecondNet: A Data Center Network Virtualization Architecture with Bandwidth Guarantees," Nov. 30-Dec. 3, 2010, 12 pages, ACM CoNEXT 2010, Philadelphia, USA.
Rong Pan et al., "QCN: Quantized Congestion Notification," 2007, 26 pages.
Alan Shieh et al., "Sharing the Data Center Network," 2011, 14 pages.
Chuanxiong Guo, et al., "BCube: A High Performance, Server-centric Network Architecture for Modular Data Centers", Aug. 2009, 12 pages, SIGCOMM' 09, ACM 978-1-60558-954-9/09/08, Barcelona, Spain.
Mohammad Al-Fares, et al., "A Scalable, Commodity Data Center Network Architecture", Aug. 2008, 12 pages, SIGCOMM' 08, ACM 978-1-60558-175-0/08/08, Seattle, Washington, USA.
Jing Zhu, et al., "Towards Bandwidth Guarantee in Multi-tenancy Cloud Computing Networks", Oct. 30, 2012, 10 pages.
Dinan, James et al., "Efficient Multithreaded Context ID Allocation in MPI", Sep. 23, 2012, 10 pages.
Gurusamy, Mohan et al., "An Integrated Resource Allocation Scheme for Multi-Tenant Data-center", Oct. 22, 2012, 9 pages, 37th Annual IEEE Conference on Local Computer Networks, LCN 2012, Clearwater, Florida.
Kumar Das, Subir et al., "Weight Based Multicast Routing Protocol for Ad hoc Wireless Networks", Nov. 17, 2002, 5 pages, IEEE.

* cited by examiner

METHOD AND SYSTEM TO ALLOCATE BANDWIDTH IN CLOUD COMPUTING NETWORKS

FIELD OF INVENTION

The embodiments of the invention are related to the field of cloud computing networks. More specifically, the embodiments of the invention relate to a method and system for allocating bandwidth to tenants requiring bandwidth in a cloud computing networks.

BACKGROUND

Cloud computing has transformed the way applications are created and run in recent years. It employs the Infrastructure as a Service (IaaS) model in which customers outsource their computing and software capabilities to third party infrastructures and pay for the service usage on demand. Compared to the traditional computing model that uses dedicated, in-house infrastructures, cloud computing provides many advantages, including economies of scale, dynamic provisioning, and low capital expenditures. It allows customers to establish and rapidly expand a global presence in minutes rather than days or months, with the "pay-as-you-go" charging model.

Despite the tremendous momentums it grows, many companies are still reluctant to move their services or enterprise applications to the cloud, due to reliability, performance, security and privacy concerns. To maximize economic benefits and resource utilization, multiple virtual machines (VM) are simultaneously initiated to execute on the same physical server. Many network service providers, including cloud providers, use host based virtualization technologies to realize separation and performance isolation between VMs on the end-host level. In the network that interconnects hosts, the same set of physical routers and links are deployed to carry traffic for all customers indistinguishably. In this kind of infrastructure, the network service providers do not offer guaranteed network resources to tenants. Therefore, the bandwidth between VMs of the same tenant can vary significantly over time, depending on the network load and usage from other tenants. This kind of bandwidth variation in a cloud computing environment hinders a tenant's capability to operate efficiently and to carry on mission critical activities. Network service providers need more efficient network resource allocation methods.

SUMMARY

A method implemented by a network service provider to provide a virtual network to tenants requiring bandwidth in a cloud computing environment, wherein the virtual network includes a first set of one or more virtual switches that manage a second set of one or more physical servers that host a first plurality of available virtual machines (VMs), the method comprising receiving by at least one virtual switch a bandwidth request for a second plurality of VMs, determining whether to accept the request of the second plurality of VMs by calculating an allocation range (AR) associated to the virtual switch, wherein the AR denotes at least one discontinuous VM allocation space within the virtual switch, and allocating VMs to the tenant in response to the determination of accepting the request of the second plurality of VMs.

A network element serves as a virtual switch for a network service provider to provide a virtual network to a tenant requiring bandwidth in a cloud computing environment, wherein the virtual network includes a first set of one or more virtual switches that manage a second set of one or more physical servers that host a first plurality of available virtual machines (VMs). The network element comprises a user interface module to receive a bandwidth request from a tenant, a user request conversion module to convert the bandwidth request into a request of a second plurality of VMs, an allocation range (AR) calculation module to calculate an AR associated to the virtual switch to determine whether to accept the request of the second plurality of VMs, wherein the AR denotes at least one discontinuous VM allocation space within the virtual switch, and a VM allocation module to allocate VMs to the tenant in response to the determination to accept the request of the second plurality of VMs.

BRIEF DESCRIPTION OF THE DRAWINGS

The present invention is illustrated by way of example, and not by way of limitation, in the figures of the accompanying drawings in which like references indicate similar elements. It should be noted that different references to "an" or "one" embodiment in this disclosure are not necessarily to the same embodiment, and such references mean at least one. Further, when a particular feature, structure, or characteristic is described in connection with an embodiment, it is submitted that it is within the knowledge of one skilled in the art to affect such feature, structure, or characteristic in connection with other embodiments whether or not explicitly described.

DETAILED DESCRIPTION

Figure 1:
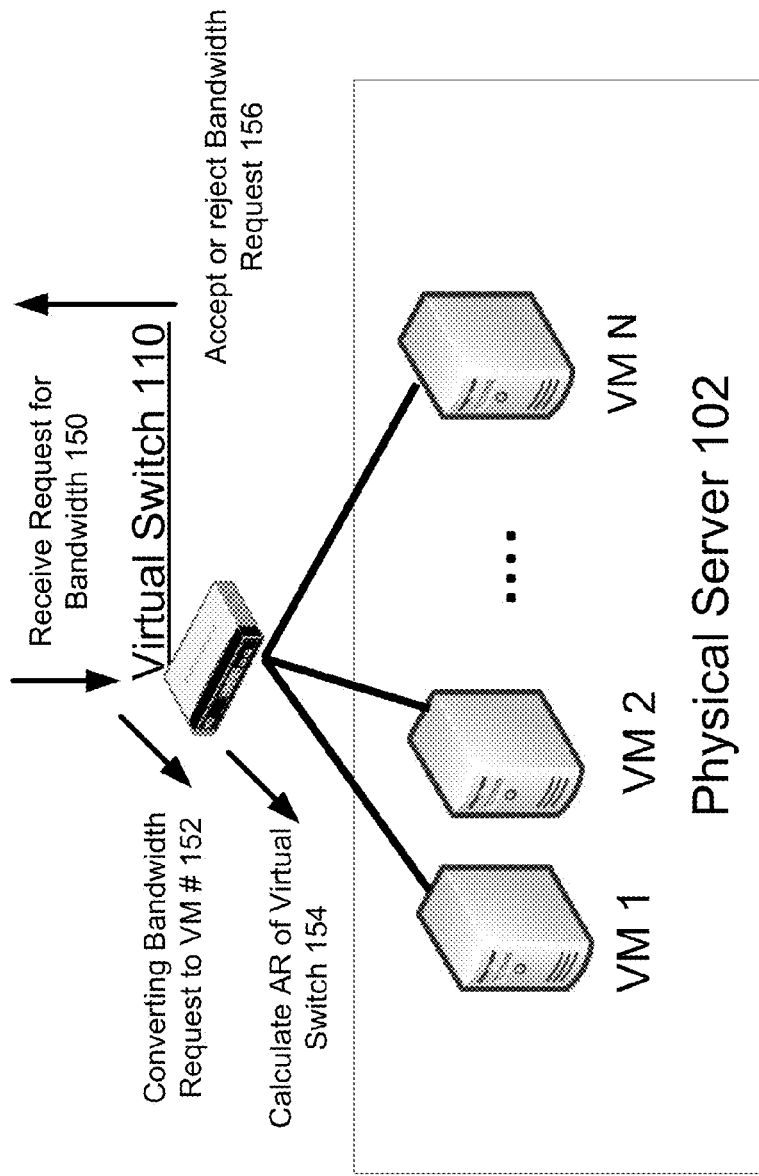
FIG. 1 is a block diagram illustrating one embodiment of a network configuration and its associated operation.

In the following description, numerous specific details are set forth. However, it is understood that embodiments of the invention may be practiced without these specific details. In other instances, well-known circuits, structures and techniques have not been shown in detail in order not to obscure the understanding of this description. It will be appreciated, however, by one skilled in the art that the invention may be practiced without such specific details. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

As used herein, a network element (e.g., a router, switch, bridge) is a piece of networking equipment, including hardware and software that communicatively interconnects other equipment on the network (e.g., other network elements, end stations). Some network elements are "multiple services network elements" that provide support for multiple networking functions (e.g., routing, bridging, switching, Layer 2 aggregation, session border control, Quality of Service, and/or subscriber management), and/or provide support for multiple application services (e.g., data, voice, and video). Subscriber end stations (e.g., servers, workstations, laptops, netbooks, palm tops, mobile phones, smartphones, multimedia phones, Voice Over Internet Protocol (VOIP) phones, user equipment, terminals, portable media players, GPS units, gaming systems, set-top boxes) access content/services provided over the Internet and/or content/services provided on virtual private networks (VPNs) overlaid on (e.g., tunneled through) the Internet. The content and/or services are typically provided by one or more end stations (e.g., server end stations) belonging to a service or content provider or end stations participating in a peer to peer service, and may include, for example, public webpages (e.g., free content, store fronts, search services), private webpages (e.g., username/password accessed webpages providing email services), and/or corporate networks over VPNs. Typically, subscriber end stations are coupled (e.g., through customer premise equipment coupled to an access network (wired or wirelessly)) to edge network elements, which are coupled (e.g., through one or more core network elements) to other edge network elements, which are coupled to other end stations (e.g., server end stations).

Different embodiments of the invention may be implemented using different combinations of software, firmware, and/or hardware. Thus, the techniques shown in the figures can be implemented using code and data stored and executed on one or more electronic devices (e.g., an end station, a network element). Such electronic devices store and communicate (internally and/or with other electronic devices over a network) code and data using computer-readable media, such as non-transitory computer-readable storage media (e.g., magnetic disks; optical disks; random access memory; read only memory; flash memory devices; phase-change memory) and transitory computer-readable transmission media (e.g., electrical, optical, acoustical or other form of propagated signals—such as carrier waves, infrared signals, digital signals). In addition, such electronic devices typically include a set of one or more processors coupled to one or more other components, such as one or more storage devices (non-transitory machine-readable storage media), user input/output devices (e.g., a keyboard, a touchscreen, and/or a display), and network connections. The coupling of the set of processors and other components is typically through one or more busses and bridges (also termed as bus controllers). Thus, the storage device of a given electronic device typically stores code and/or data for execution on the set of one or more processors of that electronic device.

In a cloud service environment, an ideal network resource allocation method may have several desirable features. First, it may allow tenants to specify the demand of their applications in an intuitive way and support flexible updates. More specifically, on the one hand, it needs to maintain the simplicity of the interface between tenants and providers for configuring different services. On the other hand, the tenants should be able to specify various types of demand requirements. The allocation method should allow that the tenant's request can be satisfied during the whole duration of the usage. Second, the provider may be able to leverage the advantage of multiplexing to support many virtual networks on their physical network. The greater the amount of sharing is, the more revenue the cloud provider gets. Third, the allocation method may scale with the size of the tenant. If the bandwidth request of a tenant exceeds the network capacity of the cloud, a rejecting decision should be given to the tenant as soon as possible, so that the tenant can adjust its request or choose other cloud providers. If the tenant request can be accepted, the VM allocation should also be completed quickly to allow the tenant launching its application tasks earlier. The present invention proposes a method and system of resource allocation that contains these features.

FIG. 1 is a block diagram illustrating one embodiment of a network configuration and its associated operation. In a cloud computing environment, tenants can be subscriber end stations, e.g., servers, workstations, laptops, netbooks, palm tops, mobile phones, smartphones, multimedia phones, Voice Over Internet Protocol (VOIP) phones, user equipment, terminals, portable media players, GPS units, gaming systems, or set-top boxes. These tenants run software applications that require bandwidth A network service provider (or cloud provider) offers virtual network services to tenants by assigning tenants inter-connecting virtual machines (VMs). Note the terms network service provider and cloud provider are used interchangeably within the specification. Tenants do not need to be aware of the underlying physical infrastructure, but only to concern if the high-level service level agreements (SLAs) can be met. To this end, each tenant can specify her requirement of the network service in terms of topology connectivity, security policy, required bandwidth, and etc. This invention focuses on the bandwidth requirement, which is one of most important network performance metrics.

Referring to FIG. 1, a tenant requires a bandwidth to virtual switch 110 at reference 150. A virtual switch is a device managing and connecting VMs in a cloud computing environment. Virtual switch 110 converts the bandwidth requirement in terms of bits per second to the number of VMs at reference 152. Virtual switch 110 then determines whether or not to accept the tenant's bandwidth request at reference 154. The determination is based on a new data structure, allocation range (AR), associated with the virtual switch. As discussed in detail herein below, AR of a virtual switch is calculated based on a number of factors. Assuming that virtual switch 110 determines it has enough resources to allocate bandwidth for the tenant, it proceeds to allocate VMs on physical server 102 and let the tenant know at reference 156. Note that even though virtual switch 110 is depicted as a separate device, it can be integrated within a physical server. For example, a hypervisor, also called a virtual machine manager (VMM), which manages concurrent virtual machine sessions of a physical server, may contain the functionality of a virtual switch. In this specification, physical server and server are used interchangeably.

Figure 2:
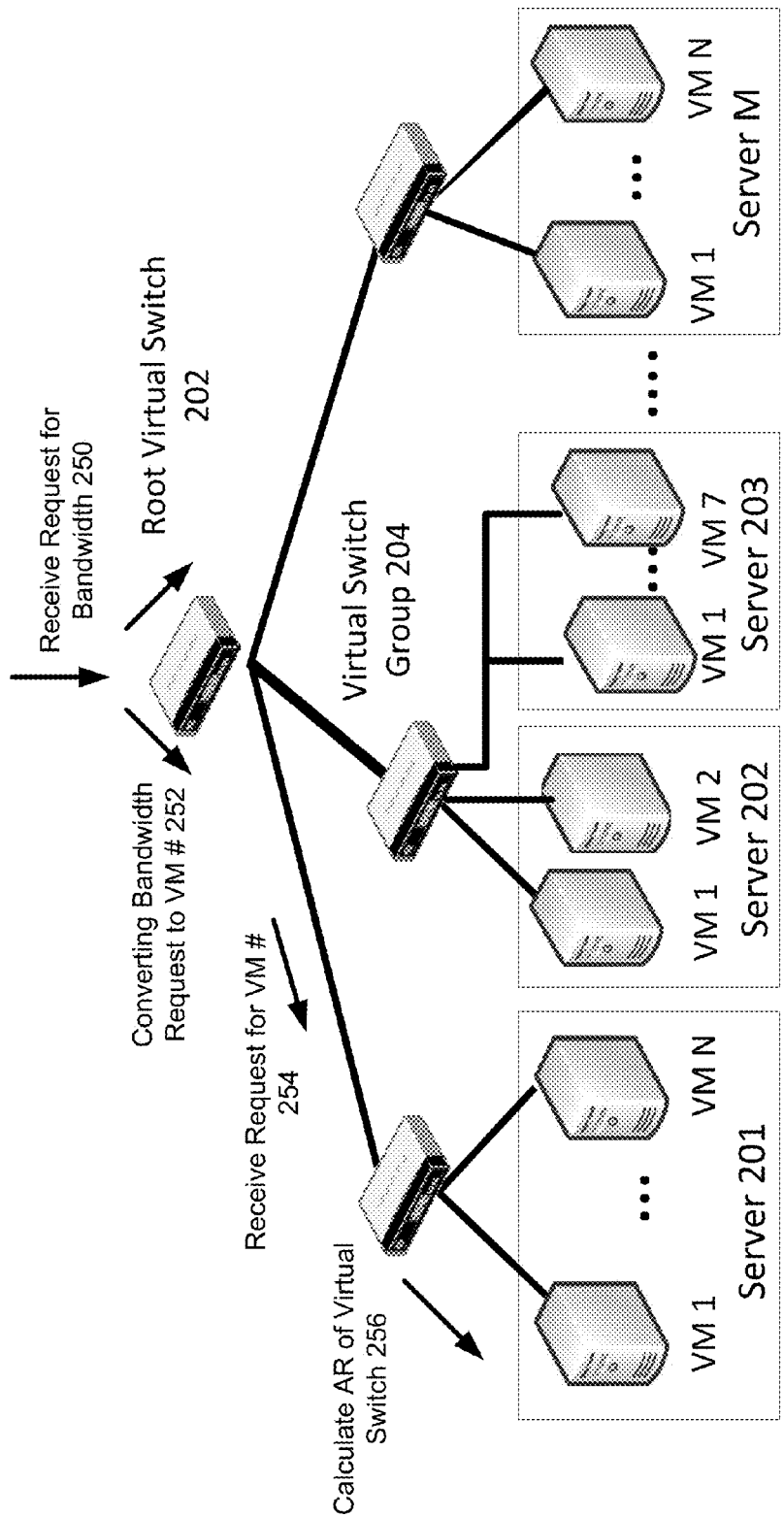
FIG. 2 is a block diagram illustrating another embodiment of a network configuration.

FIG. 2 is a block diagram illustrating another embodiment of a network configuration. In FIG. 1, a tenant's bandwidth request sends to a virtual switch and the virtual switch controls a physical server containing multiple VMs. FIG. 2 depicts a more complex network configuration. In FIG. 2, a root virtual switch 202, interacts with external tenant requests. Root virtual switch 202 manages a group of virtual switches, virtual switch group 204. Each switch of the virtual switch group 204 manages a cluster of physical servers, which contain multiple VMs within. As shown, each switch may contain a different number of servers, and each server may manage a different number of VMs. In a layered virtual switch network as depicted in FIG. 2, only root virtual switch 202 converts a tenant's bandwidth request into a number of VMs, and root virtual switch 202 determines how many VMs to be asked to each virtual switch below. Referring to FIG. 2, a tenant requires a bandwidth to the root virtual switch 202 at 250. The request of a bandwidth then is converted to a request of a number of VMs at 252. The request of VMs then relay to the cluster of virtual switches, virtual switch group 204. The virtual switches within virtual switch group 204 then determine if the requested number of VMs can be accommodated within servers they manage at 256. Note even though only two levels of virtual switches are depicted in FIG. 2, in practice, many more levels of virtual switches are implemented, and similar methodology of bandwidth allocation can be implemented. In addition, the proposed bandwidth allocation methodology can be implemented in many deferent ways. For example, instead of a root virtual switch, one may use an orchestration layer of a cloud computing environment, where a cloud orchestrator examines incoming bandwidth requests from multiple tenants and determine feasibility of accommodating certain requests and allocating VMs using methods discussed herein. In addition, a virtual switch manager, also called hypervisor, may manage tenant requests and determinate determine feasibility of accommodating certain requests and allocating VMs.

Figure 3:
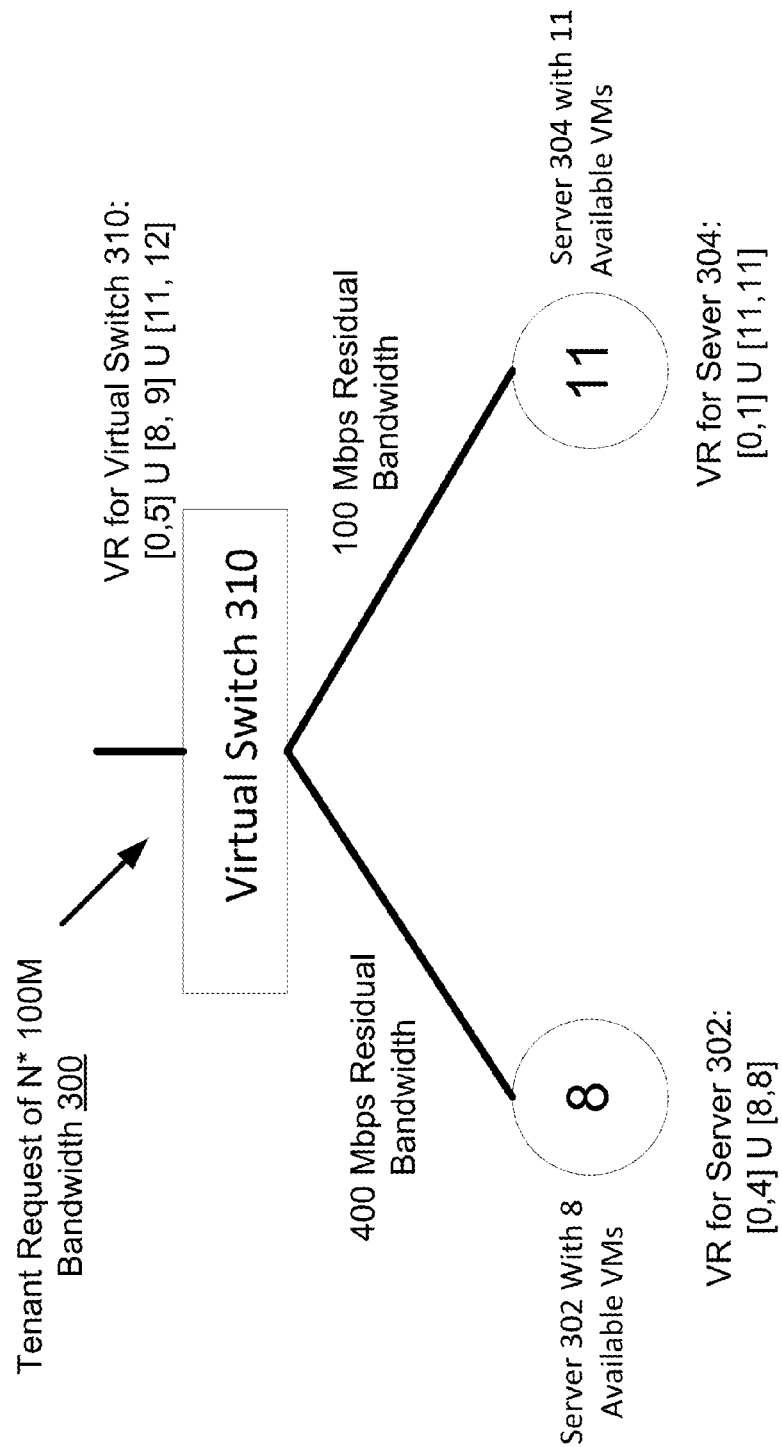
FIG. 3 is a block diagram illustrating one embodiment of allocation range (AR) values for virtual switch and physical servers.

FIG. 3 is a block diagram illustrating one embodiment of allocation range (AR) values for virtual switch and physical servers. In FIG. 3, virtual switch 310 manages server 302 and server 304. There are 400 Mbps and 100 Mbps residual bandwidths between server 302/304 and virtual switch 310 respectively. Residual bandwidths are bandwidths that are currently available to allocate in a communication path. Assume Servers 302 304 contain 8 and 11 available VMs respectively with 100 Mbps bandwidth on each VM. Further assume a tenant requests a bandwidth and the bandwidth request is converted to a number of VM with 100M bps required per VM. In that case, server 302 can accommodate from 0 to 4 VMs. Server 302 always may not accept any VM, thus 0 VM allocation is feasible. Because the residual bandwidth between server 302 and virtual switch 310 is 400 Mbps, server 302 can take up to 4 VMs (4*100 Mbps=400 Mbps residual bandwidth). Server 302 cannot allocate more than 4 VMs because of the residual bandwidth limitation. However, if the tenant allocates all its bandwidth requests to server 302 thus it does not need to communicate with any other server, the tenant can get the whole 8 available VMs. Thus, we may denote the feasible allocation space to be [0, 4] U [8, 8], i.e., server 302 may be allocated either 0 to 4, or 8 VMs. Similarly, the other server, server 304, managed by virtual switch 310 may allocate 0 to 1 VM due to 100 Mbps residual bandwidth limitation, or 11 VMs, when the total bandwidth request can be accommodated by server 304. That is, the feasible allocation space for server 304 is [0, 1] U [11, 11]. At virtual switch 310 level, the allocation space [0, 5] is feasible and it is accomplished by allocation space [0, 4] at server 302 and [0, 1] at server 304. The allocation space [8, 9] is also feasible and it is accomplished by allocation space [8, 8] and [0, 1]. Note that this allocation space is feasible because there are 100 Mbps residual bandwidths left on the link between virtual switch 310 and server 304, which is the minimum required for communication between different VMs allocated to a single VM (100M is the basic bandwidth for the tenant). In addition, the allocation space [11, 12] is also feasible for virtual switch 310 and it is accomplished by allocation space [0, 1] at serve 302 and allocation space [11, 11] at server 304. Note server 302 cannot allocate anything more than one VM because the residual bandwidth between virtual switch 310 and server 304 is only 100 Mbps and for the VMs belong to a same tenant to communicate, the VMs on server 302 cannot take more bandwidth than the smallest pipe between the two servers. In total, the feasible allocation space for virtual switch 310 is [0, 5] U [8, 8] U [11, 12]. In other words, virtual switch cannot allocate a continuous number of VMs for a given bandwidth request.

Figure 4:
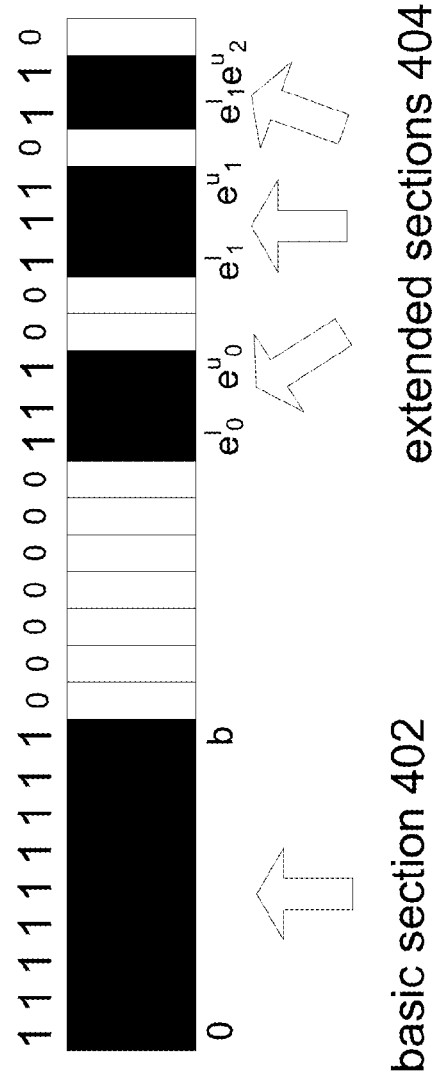
FIG. 4 is a block diagram illustrating one embodiment of an AR.

Based on the observation that the allocation of VMs may be discontinuous, a new data structure, called allocation range, may be used to denote the discontinuous allocation space. FIG. 4 is a block diagram illustrating one embodiment of an allocation range for a node. A node can be a virtual switch or a server. In FIG. 4, an AR is a bit stream. The length of the bit stream equals to the number of VMs required plus one. In one embodiment, if n VMs can be allocated into the subtree rooted from a node i, the nth leftmost bit of AR is set as 1 and it is a feasible solution for node i and it is denoted as AR(i). For example, if AR(i) is 11100110, it means that 0, 1, 2, 5, or 6 VMs can be allocated into a subtree rooted from node i. Referring to FIG. 3, for a tenant requesting 12 VMs, the AR will have 13 bits. The AR for server 302 is 1111100010000 and the AR for server 304 is 1100000000010 respectively. The AR for virtual switch 310 is the combination of the two, and it will have an AR of 1111110011011. The AR denotes feasible VM allocation for a requesting tenant. As discussed herein above in the example of FIG. 3, the value of an AR may depend on the number of available VMs and residual bandwidths in the links connecting servers and virtual switches.

Like the AR for virtual switch 310 in FIG. 3, an AR can have several continuous feasible solution spaces. For convenience, the first continuous feasible solution space may be called the basic section, and the other feasible solution spaces the extended sections. If we use an array of lower bounds and upper bounds to denote these sections, it is in the form of $\{[0, b], [e^l_0, e^u_0] \ldots [e^l_k; e^u_k]\}$, where b is the upper bound of the basic section, $e^l_q$ and $e^u_q$ are the lower bound and the upper bound of the $q^{th}$ extended section, respectively. The lower bound of the basic section is 0 because allocating no VMs into a sub-tree is always a feasible solution. FIG. 4 shows the structure of an AR containing 28 bits (for 27 VMs) with basic section 402 and extended sections 404. A known AR represents a known feasible space for allocating VMs to a requesting tenant, thus the calculating of AR is a key component of resource allocation. Note, a bit stream is only one embodiment of AR. AR may be implemented in different ways yet still embody the inventive idea discussed within. For example, an AR may be implemented as an array with each element of the array representing allocation of a particular VM to a requesting tenant. An AR may also be implemented as a numeric value converted from a binary bit stream.

Figure 5:
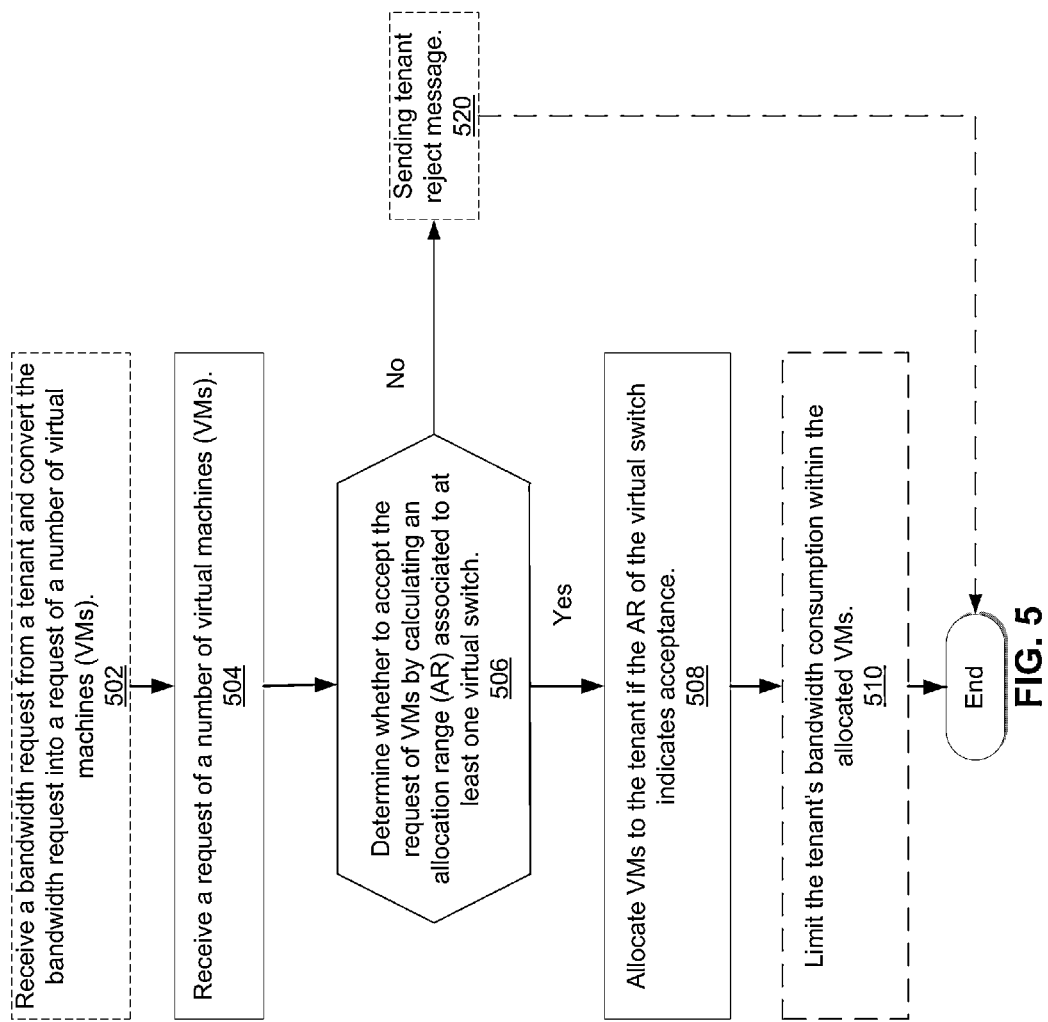
FIG. 5 is a flow diagram illustrating one embodiment of a bandwidth allocation method.

FIG. 5 is a flow diagram illustrating one embodiment of a bandwidth allocation method. The process may optionally starts with the receiving of a bandwidth request from a tenant at block 502. The party receives the request may be a root virtual switch, a network manager managing virtual switches, or an orchestrator within the orchestration layer of the network service provider. The bandwidth request is converted to a request of a number of virtual machines so that a virtual machine may accept. At block 504, the request of a number of virtual machine is received by at least a virtual switch. The virtual switch will calculate an AR and determine if it has enough resources to support the requesting tenant. If the request can be accommodated, VMs will be allocated at block 508. If the request cannot be accommodated, optionally a reject message is sent back to the requesting tenant and the process end. The tenant may make the request to a different virtual switch, or it may reduce the bandwidth request and try again. If the virtual switch allocates VMs to the requesting tenant, it may limit the tenant's bandwidth consumption within the allocated VMs at 510.

Figure 6:
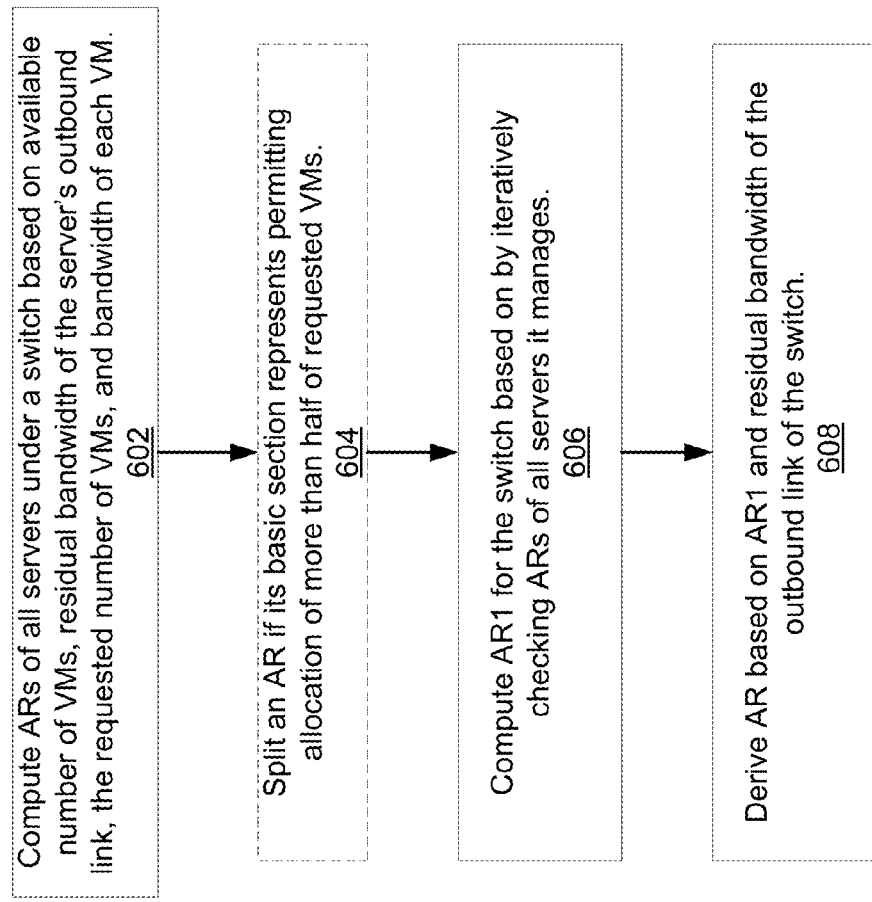
FIG. 6 is a flow diagram illustrating one embodiment of computing AR of a virtual switch.

FIG. 6 is a flow diagram illustrating one embodiment of computing AR of a virtual switch. The calculation of AR of a virtual switch starts with computing of ARs of all servers under the switch at block 602. In one embodiment, the calculation depends on the available of VMs of the servers, residual bandwidth of the servers to its outbound links to a virtual switch, the requested number of VMs, and the bandwidth of each VM. If a calculated AR of a virtual server contains more than half of the requested VMs, the AR may be split into half at block 604. Then by iteratively checking the ARs of the servers it manages, one derives the $AR_1$ for the switch at block 606. $AR_1$ is the AR without considering the residual bandwidth of an outbound link of the virtual switch to another virtual switch within the network. Then at block 608, adding the consideration of residual bandwidth, one may derive an AR of the virtual switch.

Figure 7:
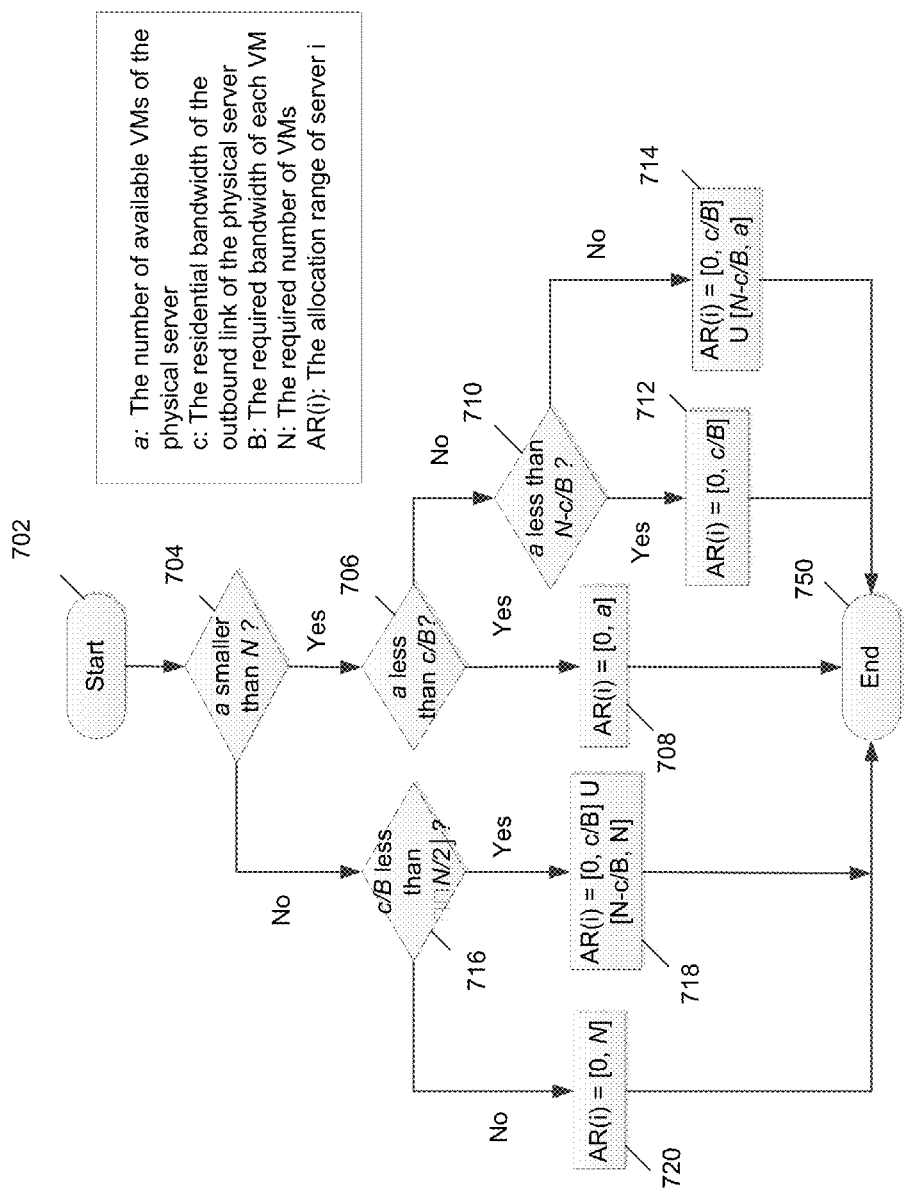
FIG. 7 is a flow diagram illustrating one embodiment of calculation of AR for a physical server.

FIG. 7 is a flow diagram illustrating one embodiment of calculation of AR for a physical server. For a physical server, the requested number of VM, N, is known. Also that the number of available VMs on the server, a, the residual bandwidth of the outbound link of the server, c, and the required bandwidth of each VM, B, are known. Based on the knowledge, the process starts at 702, and it then first determine if the number of available VMs a is smaller than N or not at 704. If it is not smaller, at block 716, it then determines whether c/B is less than [N/2]. If it is not, at block 720, the AR of server i, AR(i), is given the value of [0, N] and the calculation is complete and the request of N VMs can be accommodated. If at block 720, c/B is less than [N/2], AR(i) is given the value of [0, c/B] U [N−c/B, N]. Back to block 704, if a is smaller than N, then it determines if a is less than c/B at block 706. If it is, at block 708, AR(i) is given the value of [0, a]. If a is no less than c/B, then at block 710, it determines if a is less than N−c/B. If it is, AR(i) is given the value of [0, c/B] at block 712. Otherwise, it is given the value of [0, c/B] U [N−c/B, a]. The calculation may also expressed in the following formula for AR(i):

$$AR(i) = \begin{cases} [0, N] & \text{if } a \geq N \text{ \& } \frac{c}{B} \geq \lfloor \frac{N}{2} \rfloor \\ [0, \frac{c}{B}] \cup [N - \frac{c}{B}, N] & \text{if } a \geq N \text{ \& } \frac{c}{B} < \lfloor \frac{N}{2} \rfloor \\ [0, \frac{c}{B}] \cup [N - \frac{c}{B}, a] & \text{if } \frac{c}{B} < N - \frac{c}{B} \leq a < N \\ [0, \frac{c}{B}] & \text{if } \frac{c}{B} \leq a < N - \frac{c}{B} \\ [0, a] & \text{if } a < \frac{c}{B} \end{cases}$$

Note the calculation of AR(i) of a physical server may be executed by different devices within the network. It may be calculated by the server itself, a hypervisor of a VM, a virtual switch, or a different network manager.

Figure 8:
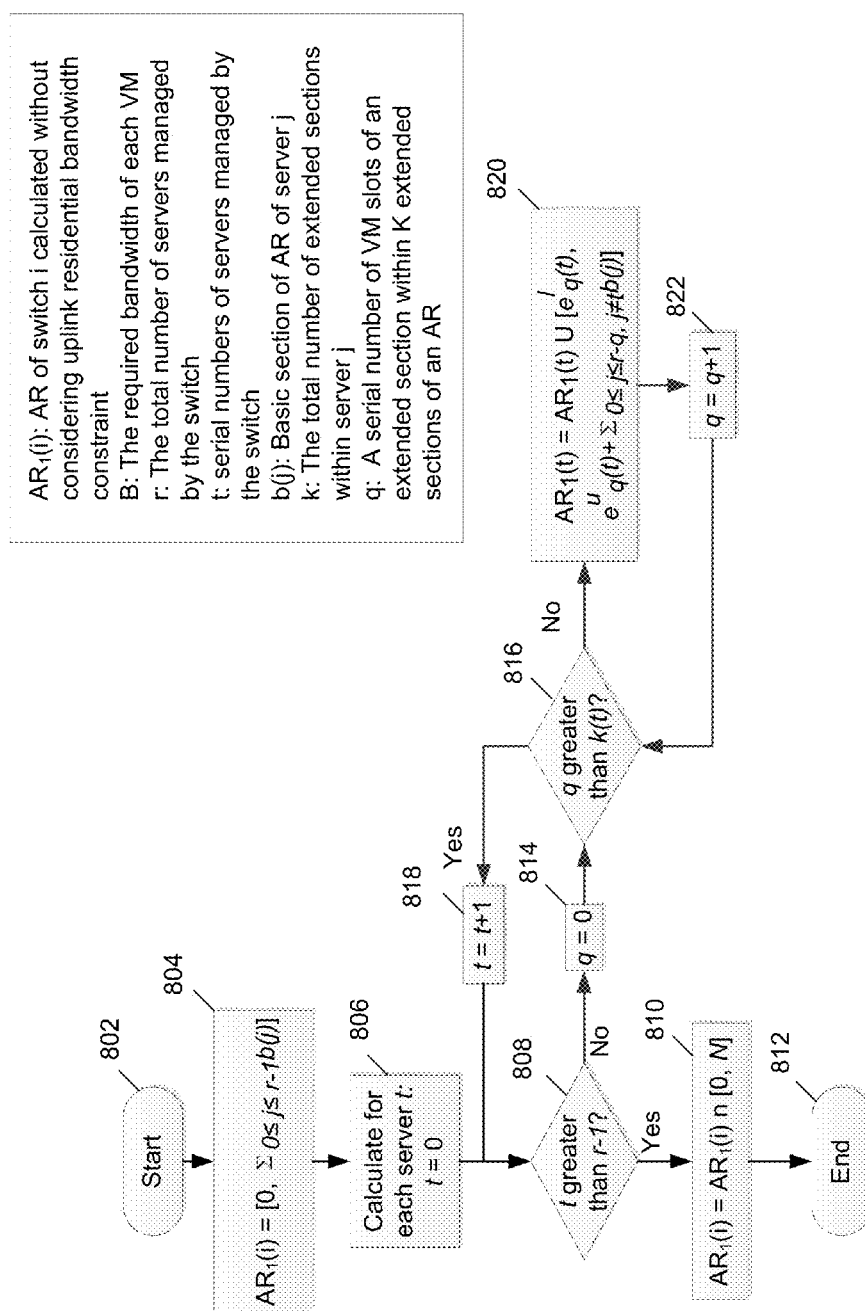
FIG. 8 is a flow diagram illustrating one embodiment of calculation of AR for a virtual switch without considering residential bandwidth constraint.

FIG. 8 is a flow diagram illustrating one embodiment of calculation of AR for a virtual switch without considering residual bandwidth constraint. The AR for a virtual switch without considering residual bandwidth constraint can be denoted as $AR_1(i)$ for switch i. For a switch i, the required bandwidth of each VM, B, the total number of servers managed by the switch, r, are known. As discussed herein above, the calculation of AR for a virtual switch is after the ARs of the servers managed by the virtual switch are already determined. Thus, the basic section of ARs for each server j, b(j), the total number of extended sections within server j, k, and the serial number of VM slots of an extended section within k extended sections of an AR, q, are also known. With the known values, the calculation of $AR_1(i)$ starts at block 802. $AR_1(i)$ is set to be $[0, \Sigma_{0 \leq j \leq r-1} b(j)]$ at block 804. Then the process starts to reiterate with every server at block 806, where t is a serial number of a server managed by the switch. At block 808, it determines if t is greater than r−1. If it is, $AR_1(i)$ is assigned to $AR_1(i) \cap [0, N]$ at block 810. Then process then ends at block 812. If it is not, q is set to zero at block 814. The process then determines whether q is greater than k(t) or not at block 816. If it is, t increments by one and the process goes back to block 808. If it is not, $AR_1(i)$ is assigned to be $AR_1(t) \cup [e^l_q(t), e^u_q(t) + \Sigma_{0 \leq j \leq r-q, \neq t} b(j)]$ and the process goes to block 822, where q is incremented by 1. The whole process complete once ARs of all r servers managed by server i complete the calculation. The calculation may also expressed in the following formula for $AR_1(i)$:

$$AR_1(i) = [0, N] \cap \left( \bigcup \left[ 0, \sum_{0 \leq j \leq r-1} b(j) \right] \cup_{0 \leq i \leq r-1} \left( \bigcup_{0 \leq q \leq k(t)} \left[ e^l_q(t), e^u_q(t) + \sum_{0 \leq j \leq r-1, j \neq t} b(j) \right] \right) \right)$$

Now considering only the constraint of residual bandwidth of the outbound link of switch i, which denoted as $AR_2(i)$ for virtual switch i, $AR_2(i) = [0, c/B] \cup [N-c/B, N]$, or $[0,N]$ if $c/B \geq \lfloor N/2 \rfloor$. The AR for a virtual switch i is $AR_1(i) \cap AR_2(i)$, which can be used for determine if the requesting tenant's bandwidth request can be accommodated.

Figure 9:
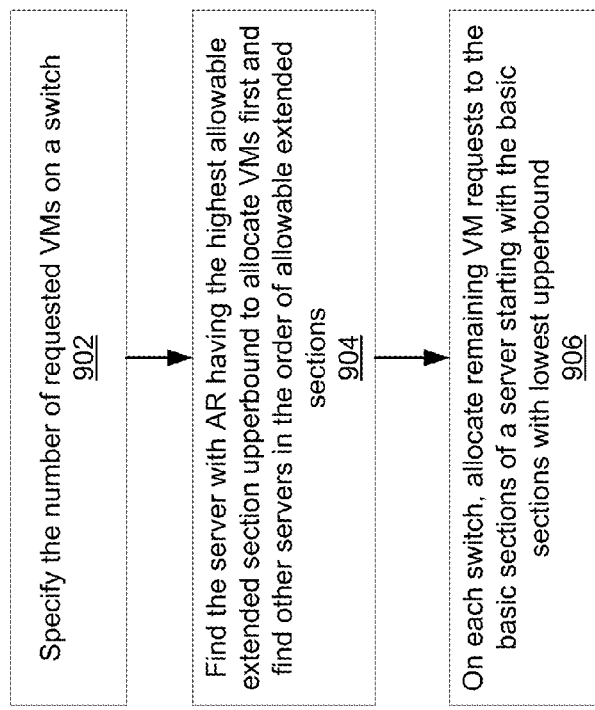
FIG. 9 is a flow diagram illustrating one embodiment of allocating VMs after a bandwidth request has been accepted.

Referring back to FIG. 5, the calculation of AR for a virtual switch discussed above is used to determine whether to accept a tenant's bandwidth request at block 506. If the calculated AR indicates a feasible allocation space for the incoming request, the process goes to block 508 and allocate VMs to the requesting tenant. FIG. 9 is a flow diagram illustrating one embodiment of allocating VMs after a bandwidth request has been accepted. Referring to FIG. 9, the process starts at block 902, where the number of requested VMs on a switch is specified. Then at block 904 the process finds the server with AR having the highest allowable extended section upper bound first and allocates VMs in the highest allowable extended section. Then the process finds the server with AR having the next highest allowable extended section upper bound and allocates VMs in the extended sections. At block 906, the process allocates the remaining requested VMs to the server with AR having the basic section with the lowest upper bound first. Then the process finds the server with AR having the basic section with the next lowest upper bound. The process allocates VM to the basic section and continues the process until all remaining VMs are allocated. This is a mixed strategy for VM allocation: It minimizes the link bandwidth utilization as the first tier optimization. The bandwidth utilization is minimized by allocating VMs to the extended section with the highest allowable extended section. At the second tier optimization, the allocation maximizes the fragment sizes. When one allocation does not use all the available VMs, the unused VMs compose the fragment of the allocation space. Since higher-level links in a subtree are more likely to become the bottleneck in a tree network, it is preferable to make the fragment size as large as possible, so that in future more VMs can be allocated into the subtree without consuming higher-level link bandwidth. The process of allocating VMs to the basic sections with lower upper bound first maximizes the fragment sizes.

Figure 10:
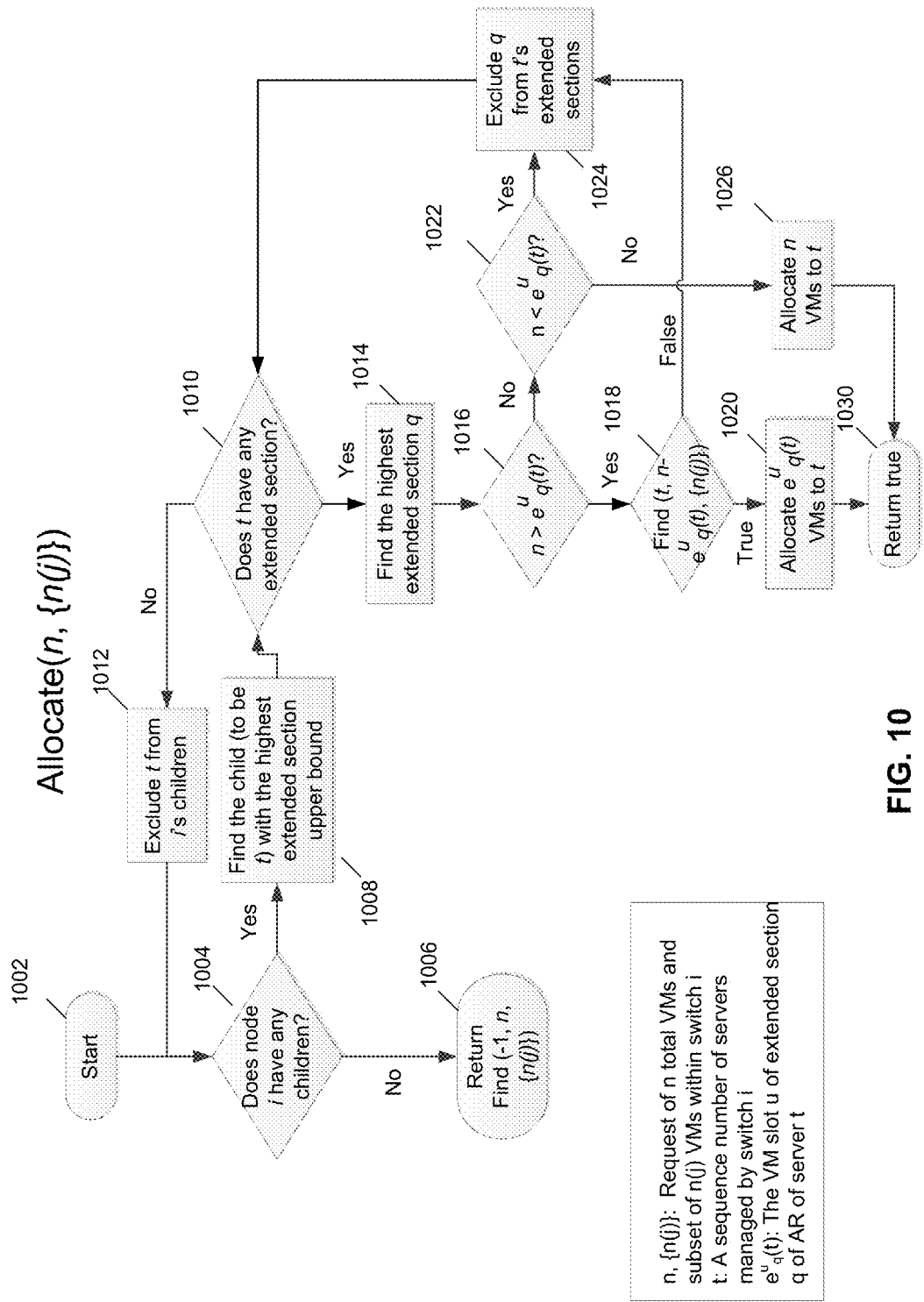
FIG. 10 is a flow diagram illustrating one embodiment of allocating VMs at extended sections within the control of a virtual switch.

FIG. 10 is a flow diagram illustrating one embodiment of allocating VMs at extended sections within the control of a virtual switch. The process allocates n VMs and a subset of VM, n(j), to each server j under management so that the combination of all n(j) equals to the total number n. Because the process may be applied to a virtual network with multiple levels of virtual switches and servers, generic terms are used. To use the process of FIG. 10 at a virtual switch controlling physical servers, a node is a virtual switch and a child is a physical server. The process starts at block 1002. At block 1004, the process determines whether node i has any children node. If there is none, the process ended and no VM may be allocated, thus the process returns (−1, n, {n(j)}), indicating no VM can be allocated. If the process determines that there is at least a child (e.g., a server with available VMs), the children are found, with the child with AR having the highest extended section upper bound being processed first (set to be t) at block 1008. At block 1010, if server t does not have extended section, the process excludes server t at block 1012 and the process returns to block 1004. If server t has at least one extended section, the process then finds the highest extended section q at block 1014. The process then determine whether the requested n is larger than $e^u_q(t)$ at block 1016. If it is, process determine if (t, n−$e^u_q(t)$, {n(j)}) can be set at block 1018. If it can be set, $e^u_q(t)$ is allocated to the requesting tenant at block 1020 and the process complete at block 1030 and return complete. Back to block 1016, if n is not larger than $e^u_q(t)$, the process goes to block 1022. Block 1022 determines whether n is less than $e^u_q(t)$. If not, at block 1026, the process allocated n VMs to sever t. Otherwise, the extended section q is excluded from server t as an available VM allocation space, and the process goes back to block 1010. Once all the servers with extended sections go through the process, the process ends either with no allocation at block 1006 or with specified allocation at block 1030, and the allocation of extended sections is accomplished.

Figure 11:
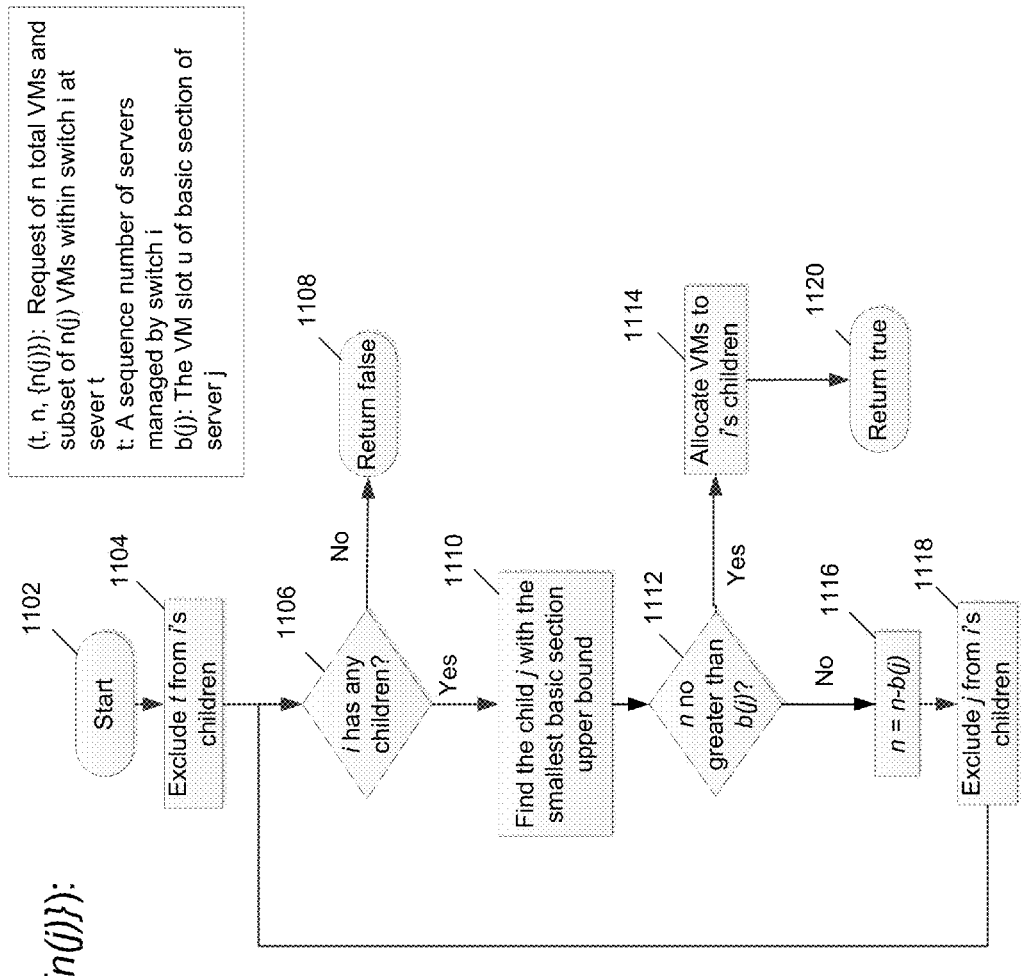
FIG. 11 is a flow diagram illustrating one embodiment of allocating VMs at basic sections within the control of a virtual switch.

FIG. 11 is a flow diagram illustrating one embodiment of allocating VMs at basic sections within the control of a virtual switch. As discussed in FIG. 9, allocating extended sections of available servers is only a part of the VM allocation process. The process needs to continue and allocate basic sections. Referring to FIG. 11, the process of allocating basic sections start at block 1102, where the server t, the total number of requested VM, n, and a subset of VM, n(j), are known and given. Server t is excluded from switch i at block 1104. The process then determines whether switch i has any children at block 1106. If there is no child, the process end, with no viable allocation returned at block 1108. If there is at least one child, the process finds the child j with the smallest basic section upper bound at block 1110. The process then determines whether n is no greater than b(j) at block 1112. If it is not, VMs are allocated to node i's child at block 1114 and the process complete with returning allocation at block 1120. Back to block 1112, if n is greater than b(j), n is set to n−b(j) at block 1116 and the server j is excluded from switch node i's children at block 1118 and the process returns to block 1106. All the children node (e.g., physical servers) of switch i goes through the process and the process ends with either basic section allocation at block 1120 or no allocation applicable at block 1108. The process of allocating both extended sections and basic sections can also be expressed as pseudo code as the following:

---

Algorithm 1: Assigning the number of VMs to each child node j on node i for homogeneous bandwidth demand.

---

1  Allocate(n, {n(j)})
   Input: n: The number of allocated VMs to i.
   Output: {n(j)}: Allocation solution.
2  Sort all extended sections by $e_q^u(j) \in AR(j)$ in a descending order;
3  for each extended section [$e_q^l(t)$, $e_q^u(t)$] do
4     if n > $e_q^u(t)$ & Find(t, n − $e_q^u(t)$, {n(j)}) then
5        $n_t \leftarrow e_q^u(t)$;
6        return true;
7     end
8     if $e_q^l(t) \le n \le e_q^u(t)$ then
9        n(t) ← n;
10       n(j) ← 0 for all j ≠ t;
11       return true;
12    end
13 end
14 return Find(−1, n, {n(j)});
15

Find(t, n, {n(j)})
Input: t: excluded child;
n: total number of VMs to allocate.
Output: {n(j)}: Allocation solution
16 Sort all [0, b(j)] ∈ AR(j), 0 ≤ j ≤ r − 1 by b(j) in a ascending order → {[0, b($o_j$)]};
17 ind ← 0;
18 while ind ≤ r − 1 do
19    if ($\Sigma_{0 \le j \le ind, o_j \ne t} b(o_j)$) ≥ n then
20       n($o_j$) ← b($o_j$) for all j < ind, $o_j$ ≠ t;
21       n($o_{ind}$) ← n − $\Sigma_{0 \le j \le ind-1, o_j \ne t} b(o_j)$;
22       return true;
23    else
24       ind + +;
25    end
26 end
27 return false;

---

Figure 12:
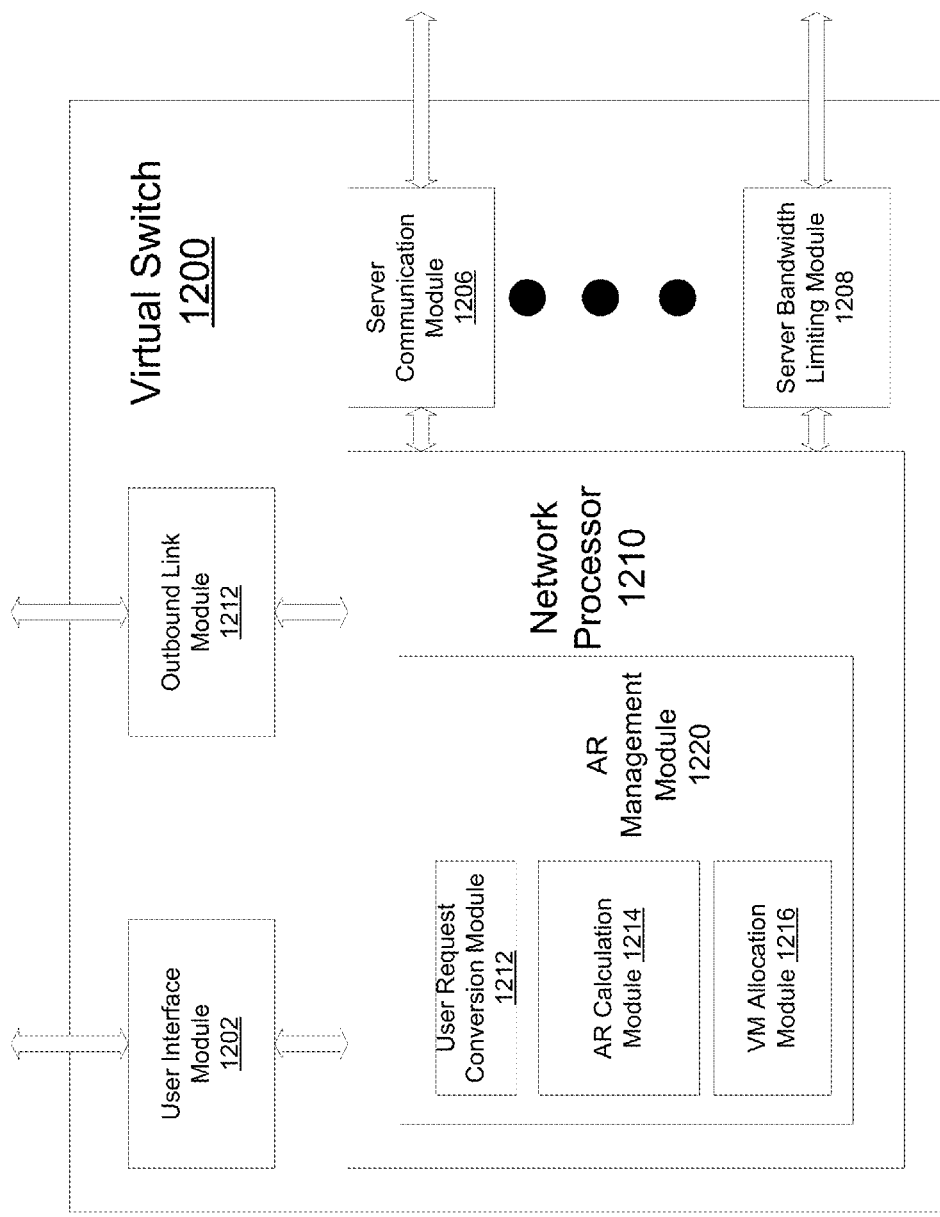
FIG. 12 is a block diagram illustrating one embodiment of a virtual switch configured to allocate bandwidth.

FIG. 12 is a block diagram illustrating one embodiment of a virtual switch configured to allocate bandwidth. Virtual switch 1200 contains a network processor 1210. For bandwidth allocation purpose, an AR management module 1220 is configured for managing AR calculation and related operations. Note AR management module 1220 may share a network processor with other processes within the virtual switch, and it may also have a dedicated network process for the sole purpose of managing AR and allocating VM. Virtual switch 1200 contains a user interface module 1202. If virtual switch 1200 is a root virtual switch or a virtual switch in charge of interfacing directly with tenants requesting bandwidth, user interface module 1202 receives bandwidth request (e.g., a number of Mbps). In that case, the bandwidth request is sent to a user request conversion module 1212 within AR management module 1220. A bandwidth request is converted to a number of VMs at user request conversion module 1212. If virtual switch 1200 is a switch of a virtual switch group, user interface module 1202 receives a request of a number of VMs as tenant's bandwidth request has been converted to the number of VMs already. Virtual switch 1200 also contains an outbound link module 1212. Outbound link module 1212 interacts with upper level virtual switches or switches of its peers. Outbound link module 1212 determines residual bandwidth of outbound links and provides the information to AR management module 1220. Particularly, residual bandwidth of outbound links is needed to calculate AR at AR calculation module 1214. In AR management module 1220, another module is VM allocation module 1216, where determination is made on how to allocate specific VMs on physical servers to a request. Also in virtual switch 1200, server communication module 1206 communicates with servers under its management. Sever communication module 1206 determines residual bandwidths of its links to servers under its management. As discussed herein above, residual bandwidth on the links between virtual switch and servers are needed to calculate AR of servers. In some embodiment, virtual switch 1200 also contains a server bandwidth limiting module 1208. Server bandwidth limiting module 1208 limits a tenant's bandwidth consumption within the allocated VMs, thus a tenant gets bandwidth no more than it has been allocated. Note not all the modules are required to implement the inventive idea within. Some modules are optional, and others modules may be implemented as an integrated module configured to complete several functions within one.

While the flow diagrams in the figures herein above show a particular order of operations performed by certain embodiments of the invention, it should be understood that such order is exemplary (e.g., alternative embodiments may perform the operations in a different order, combine certain operations, overlap certain operations, etc.).

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method implemented by a network service provider to provide a virtual network to tenants requiring bandwidth in a cloud computing environment, wherein the virtual network includes a first set of one or more virtual switches that manage a second set of one or more physical servers that host a first plurality of available virtual machines (VMs), the method comprising:
   receiving by at least one virtual switch a bandwidth request for a second plurality of VMs;
   determining whether to accept the request of the second plurality of VMs by calculating an allocation range (AR) associated to the virtual switch, wherein the AR denotes at least one discontinuous VM allocation space within the virtual switch; and
   allocating VMs to the tenant in response to the determination of accepting the request of the second plurality of VMs.

2. The method of claim 1, wherein the request for a second plurality of VMs is converted from a bandwidth request by a tenant.

3. The method of claim 1, wherein the AR is a data structure that contains a number of bits equal to one plus a number of the second plurality of VMs, each bit denoting feasibility of a specific number of VMs within the virtual switch being allocated for the bandwidth request.

4. The method of claim 1, wherein the AR of the virtual switch is calculated based in part on a residual bandwidth of an outbound link of the virtual switch and ARs associated with a third set of one or more physical servers managed by the virtual switch.

5. The method of claim 4, wherein the ARs associated with the third set of one or more physical servers are calculated based in part on residual bandwidths of outbound links of the physical servers and a third plurality of available VMs of the physical servers.

6. The method of claim 4, wherein an AR associated with a physical server of the third set of one or more physical servers is a data structure that contains a number of bits equal to one plus a number of the second plurality of VMs, each bit denoting the feasibility of a specific number of VMs within a physical server being allocated for the bandwidth request.

7. The method of claim 6, wherein the AR contains a continuous basic section and at least one extended section.

8. The method of claim 7, wherein a length of the continuous basic section is less than half of a total length of the AR.

9. The method of claim 1, wherein the first set of virtual switches are configured hierarchically with at least two levels, a higher level virtual switch managing at least one lower level virtual switch.

10. The method of claim 1, wherein VMs are allocated to servers in order from a server with a highest allowable extended section upper bound of an AR to rest of servers with lower allowable extended section of ARs.

11. The method of claim 10, wherein VMs are further allocated to servers in order from a server with VR having a lowest upper bound basic section of AR to rest of servers with higher upper bound basic sections of ARs after completion of allocating extended sections of ARs.

12. The method of claim 1, further comprising limiting tenant bandwidth consumption within the allocated VMs to the tenant.

13. The method of claim 1, further comprising sending the tenant rejection message in response to the determination of accepting the request of the second plurality of VMs.

14. A network element serving as a virtual switch for a network service provider to provide a virtual network to a tenant requiring bandwidth in a cloud computing environment, wherein the virtual network includes a first set of one or more virtual switches that manage a second set of one or more physical servers that host a first plurality of available virtual machines (VMs), the network element comprising:
   a user interface module configured to receive a bandwidth request for a second plurality of VMs;
   an Allocation Range (AR) calculation module configured to calculate an AR associated to the virtual switch to determine whether to accept the request of the second plurality of VMs, wherein the AR denotes at least one discontinuous VM allocation space within the virtual switch; and a VM allocation module configured to allocate VMs to the tenant in response to the determination to accept the request of the second plurality of VMs.

15. The network element of claim 14, further comprising:
the user interface module further configured to receive a bandwidth request for a tenant; and
a user request conversion module configured to convert the bandwidth request from the tenant into a request of a second plurality of VMs.

16. The network element of claim 14, wherein the AR is a data structure that contains a number of bits equal to one plus a number of the second plurality of VMs, each bit denoting feasibility of a specific number of VMs within the network element being allocated for the bandwidth request.

17. The network element of claim 14, further comprising a server communication module configured to communicate with a third set of one or more physical servers managed by the network element, wherein the AR of the network element is calculated based in part on a residual bandwidth of an outbound link of the network element and ARs associated with the third set of one or more physical servers.

18. The network element of claim 17, wherein the ARs associated with the third set of one or more physical servers are calculated based in part on residual bandwidths of outbound links of the physical servers and a third plurality of available VMs of the physical servers.

19. The network element of claim 17, wherein an AR associated with a physical server of the third set of one or more physical servers is a data structure that contains a number of bits equal to one plus a number of the second plurality of VMs, each bit denoting the feasibility of a specific number of VMs within a physical server being allocated for the bandwidth request.

20. The network element of claim 19, wherein the AR contains a continuous basic section and at least one extended section.

21. The network element of claim 20, wherein the AR calculation module is further configured to split ARs so that for all AR, a length of the continuous basic section is less than half of a total length of the AR.

22. The network element of claim 14, wherein the first set of virtual switches are configured hierarchically with at least two levels, a higher level virtual switch managing at least one lower level virtual switch.

23. The network element of claim 14, wherein the VM allocation module is configured to allocate VM to servers in order from a server with a highest allowable extended section upper bound of an AR to rest of servers with lower allowable extended section of ARs.

24. The network element of claim 23, wherein the VM allocation module is configured to allocate VMs servers in order from a server with VR having a lowest upper bound basic section of AR to rest of server with higher upper bound basic sections of ARs, and then allocate VMs to servers in order from a server with VR having a lowest upper bound basic section of AR to rest of server with higher upper bound basic sections of ARs.

25. The network element of claim 14, further comprising a server bandwidth limiting module configured to limit the tenant to the bandwidth allocated by the VMs.

26. The network element of claim 14, wherein the user interface module is further configured to send the tenant rejection message upon the determination that the bandwidth request cannot be satisfied.

27. A method implemented by a network service provider to provide a virtual network to a tenant requiring bandwidth in a cloud computing environment, wherein the virtual network includes a first set of virtual switches that manage a second set of physical servers hosting a first plurality of available virtual machines (VMs), the method comprising:
receiving a bandwidth request from a tenant;
converting the bandwidth request into a request of a second plurality of VMs;
determining whether to accept the request of the second plurality of VMs by calculating an allocation range (AR) associated to the virtual switch, wherein the AR denotes at least one discontinuous VM allocation space within the virtual switch, and wherein the AR is calculated based in part on a residual bandwidth of an outbound link of the virtual switch and ARs associated with a third set of one or more physical servers managed by the virtual switch;
allocating VMs to the tenant in response to the determination of accepting the request of the second plurality of VMs in order from a server with a highest allowable extended section upper bound of an AR to rest of servers with lower allowable extended section upper bound of ARs, followed by allocating in order from a server with VR having a lowest upper bound basic section of AR to rest of servers with higher upper bound basic sections of ARs; and
limiting the tenant's bandwidth consumption within the allocated VMs.

28. A network element serving as a virtual switch for a network service provider to provide a virtual network to a tenant requiring bandwidth in a cloud computing environment, wherein the virtual network includes a first set of virtual switches that manage a second set of physical servers that host a first plurality of available virtual machines (VMs), the network element comprising:
a user interface module configured to receive a bandwidth request from a tenant;
a user request conversion module configured to convert the bandwidth request into a request of a second plurality of VMs;
an Allocation Range (AR) calculation module configured to calculate an AR associated to the virtual switch to determine whether to accept the request of the second plurality of VMs, wherein the AR denotes at least one discontinuous VM allocation space within the virtual switch, and wherein the AR is calculated based in part on a residual bandwidth of an outbound link of the virtual switch and ARs associated with a third set of one or more physical servers managed by the virtual switch;
a VM allocation module configured to allocate VMs to the tenant in response to the determination to accept the request of the second plurality of VMs in order from a server with a highest allowable extended section upper bound of an AR to rest of servers with lower allowable extended section upper bound of ARs, followed by allocating in order from a server with VR having a lowest upper bound basic section of AR to rest of server with higher upper bound basic sections of ARs; and
a server bandwidth limiting module configured to limit the tenant to the bandwidth allocated by the VMs.

\* \* \* \* \*

UNITED STATES PATENT AND TRADEMARK OFFICE
CERTIFICATE OF CORRECTION

PATENT NO. : 8,938,541 B2  
APPLICATION NO. : 13/663416  
DATED : January 20, 2015  
INVENTOR(S) : Zhang et al.

Page 1 of 1

It is certified that error appears in the above-identified patent and that said Letters Patent is hereby corrected as shown below:

In the Drawings:

In Fig. 12, Sheet 12 of 12, delete

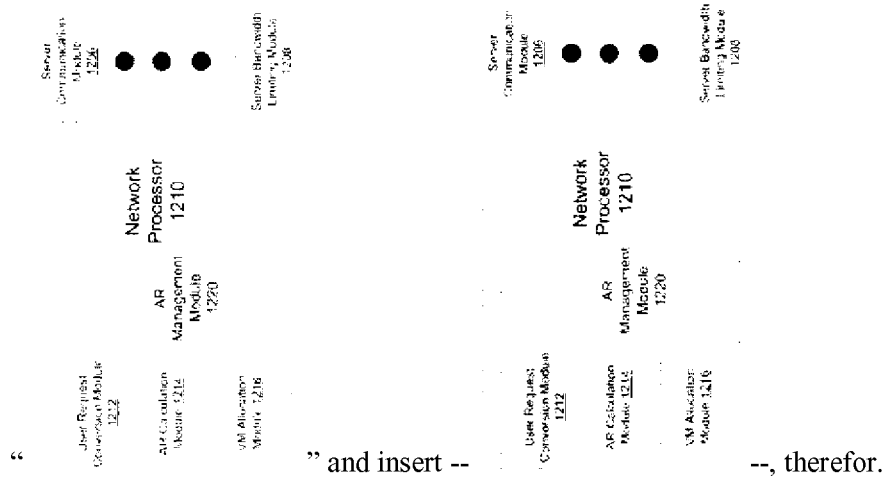

" and insert --  --, therefor.

In the Specification:

In Column 4, Line 44, delete "bandwidth" and insert -- bandwidth. --, therefor.

In Column 6, Line 18, delete "serve" and insert -- server --, therefor.

Signed and Sealed this  
Eighteenth Day of August, 2015

Michelle K. Lee  
*Director of the United States Patent and Trademark Office*